United States Patent [19]
Andrews

[11] Patent Number: 6,082,043
[45] Date of Patent: Jul. 4, 2000

[54] CHRISTMAS TREE WATERING DEVICE

[76] Inventor: Scott A. Andrews, 5 Butterfield Cir., Flossmoor, Ill. 60422

[21] Appl. No.: 09/119,057

[22] Filed: Jul. 20, 1998

[51] Int. Cl.⁷ .................................................. G08B 21/00
[52] U.S. Cl. ............................................. 47/40.5; 340/618
[58] Field of Search ................................... 47/40.5, 48.5, 47/79; 340/618

[56] References Cited

U.S. PATENT DOCUMENTS

| | | | |
|---|---|---|---|
| 3,311,270 | 3/1967 | Juergens | 47/48.5 X |
| 4,825,587 | 5/1989 | Stancil | 47/40.5 |
| 4,930,252 | 6/1990 | Krause et al. | 47/40.5 |
| 5,054,236 | 10/1991 | Sands | 47/79 |
| 5,076,009 | 12/1991 | Cibor | 47/40.5 |
| 5,157,868 | 10/1992 | Munoz | 47/50.5 |
| 5,201,140 | 4/1993 | Voohis | 47/40.5 |
| 5,243,782 | 9/1993 | Jones | 47/40.5 |
| 5,279,071 | 1/1994 | McDougall | 47/40.5 |
| 5,428,348 | 6/1995 | Gault | 340/618 |
| 5,493,277 | 2/1996 | Pierce et al. | 47/40.5 X |
| 5,513,677 | 5/1996 | McCurry | 47/40.5 X |
| 5,615,516 | 4/1997 | Brown | 47/40.5 |
| 5,625,345 | 4/1997 | Stark et al. | 340/618 |
| 5,735,726 | 4/1998 | Cohen | 446/298 |
| 5,799,437 | 9/1998 | Evans et al. | 47/40.5 |
| 5,867,929 | 2/1999 | Jung et al. | 47/40.5 |

Primary Examiner—Michael J. Carone
Assistant Examiner—Jeffrey L. Gellner
Attorney, Agent, or Firm—Thomas R. Vigil

[57] ABSTRACT

The tree or plant watering system includes: an ornament in the shape of a head of creature having an upper head shaped portion, hingedly connected to a lower liquid receptacle receiving portion; structure for mounting the ornament on a tree or plant; a tubing extending from the lower receptacle portion of the ornament to and into a container for holding liquid and for holding the base of the tree or plant; a liquid level sensor mounted in the container or on the tubing in the container and being electrically connected to an alert associated with or mounted in or on the ornament; and the alert being actuated or conversely de-actuated when the liquid in the container falls below a pre-determined level to indicate that the tree or plant needs to be watered and/or when the liquid in the container rises above a pre-determined level to indicate that watering should cease.

16 Claims, 2 Drawing Sheets

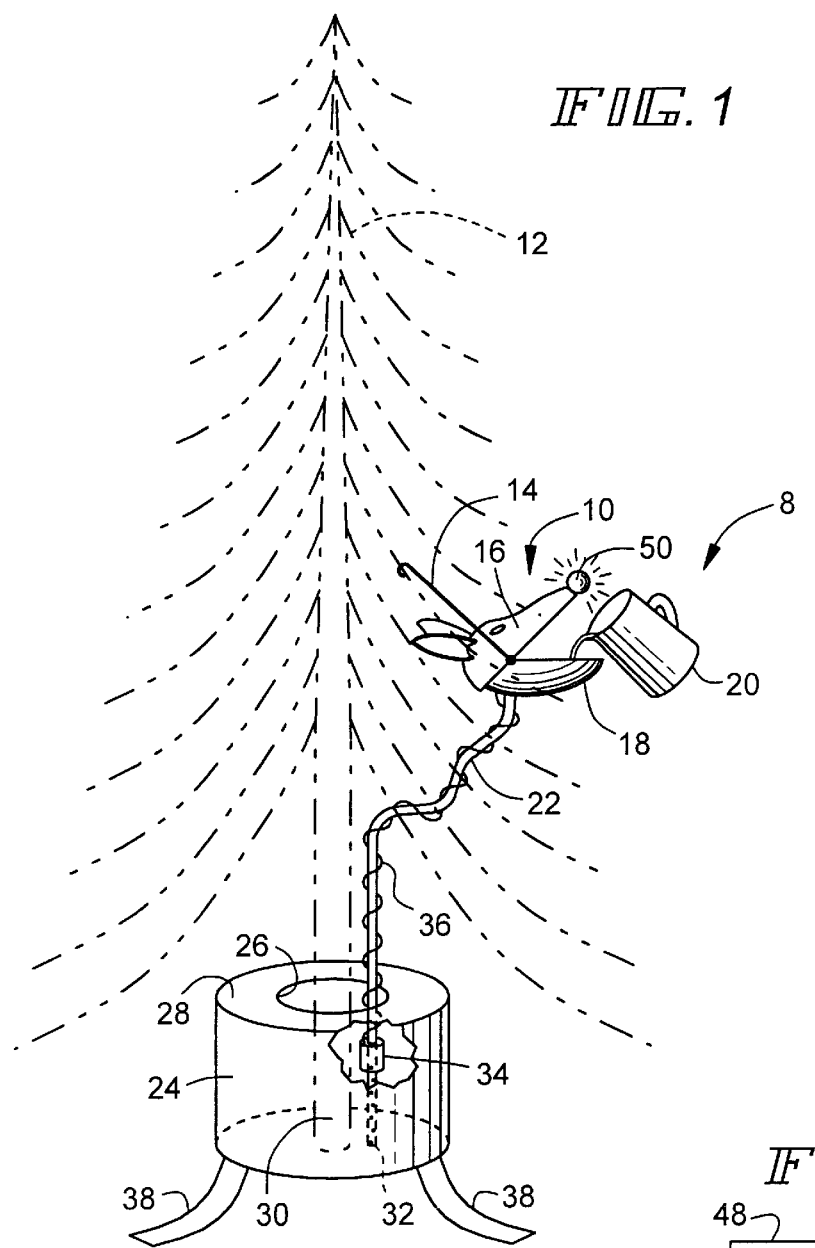
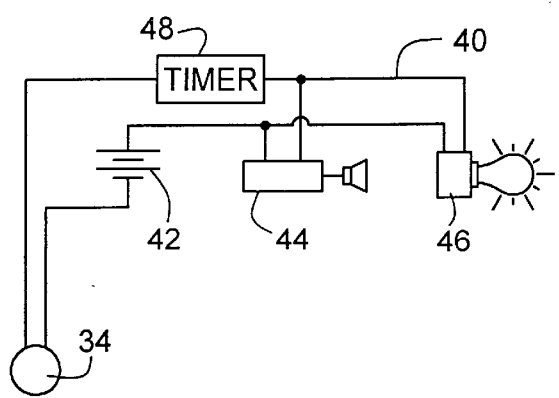

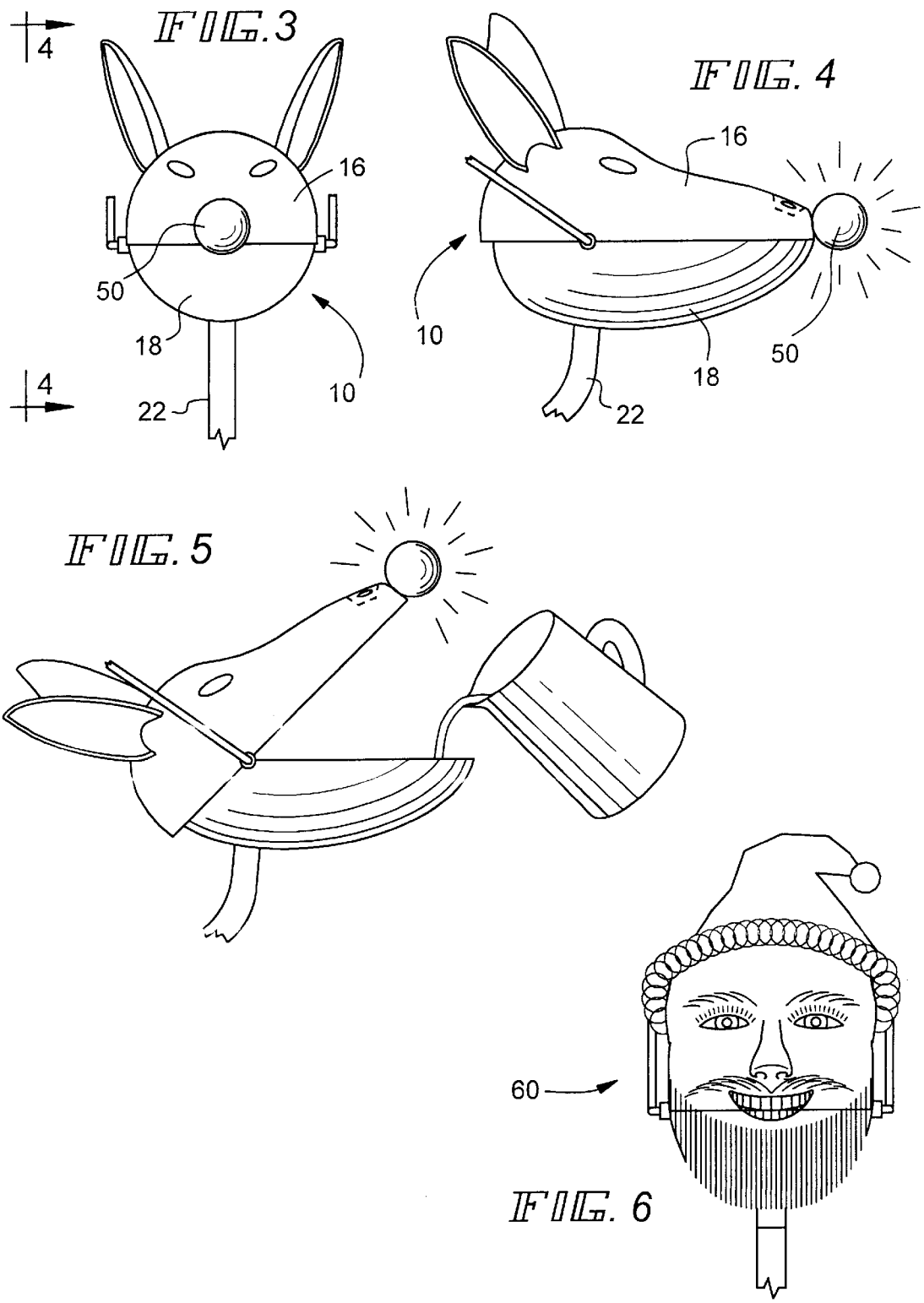

CHRISTMAS TREE WATERING DEVICE

BACKGROUND OF THE INVENTION

1. Field of the Invention

The present invention relates to a watering system for a Christmas tree whereby an ornament is used as the receiving receptacle for liquid to be delivered to a base holder or container supporting the base of a Christmas tree for supplying water to the Christmas tree. More specifically, the present invention relates to a Christmas tree watering system, including an electronic water level sensor and circuitry for providing an indication that water is needed in the container or reservoir holding the base of the tree and/or for providing an indication when watering should cease.

2. Description of the Prior Art

Heretofore, a number of Christmas tree irrigation devices have been proposed. Examples of such Christmas tree irrigation and watering devices are disclosed in the following U.S. Patents:

| U.S. Pat. No. | PATENTEE |
| --- | --- |
| 4,653,224 | Weckesser |
| 4,825,587 | Stancil |
| 4,930,252 | Krause, et al. |
| 5,054,236 | Sands |
| 5,076,009 | Cibor |
| 5,157,868 | Munoz, et al. |
| 5,201,140 | Voorhis |
| 5,327,677 | Rivera |
| 5,369,910 | Copenhaver |
| 5,473,838 | Denbigh |
| 5,615,516 | Brown |

While the U.S. Patents referred to above disclose various systems for watering a Christmas tree, including using an ornament on the tree as a receiving receptacle for water to be conducted to a container holding the base of a tree, and various valve systems for controlling the flow of liquid to the reservoir, none of the U.S. Patents cited above disclose the use of a ornament including a creature's head hingedly connected to a receiving receptacle for water to be delivered to the container holding the base of a tree, or have an indicating means such as an audible sound from a Santa Claus or a light from the nose of or other part of the head of a animal, such as Rudolph the Red Nosed Reindeer (as to the need for water).

SUMMARY OF THE INVENTION

According to the present invention there is provided a tree or plant watering system including an ornament which in one embodiment is in the shape of a head of creature having an upper head shaped portion, hingedly connected to a lower liquid receptacle receiving portion; structure for mounting the ornament on a tree or plant; a tubing extending from the lower receptacle portion of the ornament to and into a container for holding liquid and for holding the base of the tree or plant; a liquid level sensor mounted in the container, preferably on the tubing and being electrically connected to an alert associated with or mounted in or on the ornament; and the alert being actuated when the liquid in the container falls below a pre-determined level to indicate that the tree or plant needs to be watered and/or when the liquid has reached a pre-determined level to indicate that watering should cease.

BRIEF DESCRIPTION OF THE DRAWINGS

FIG. 1 is a side elevational view of the Christmas tree watering system of the present invention, and shows an ornament in the shape of a head of Rudolph the Red Nosed Reindeer with the top portion of the head rotated about a hinge so that liquid can be poured into the mouth of the head and shows tubing leading to the container for conducting the liquid poured into the mouth of the reindeer head shaped ornament into a container holding the base of the Christmas tree.

FIG. 2 is a block schematic circuit diagram of the liquid level sensing circuit coupled to a level sensor on the tubing or in the container and to an audible or visual alert associated with the ornament.

FIG. 3 is a front view of the ornament shown in FIG. 1.

FIG. 4 is a side elevational view of the ornament shown in FIG. 3, and is taken along line 4—4 of FIG. 3.

FIG. 5 is an enlarged view of the ornament shown in FIG. 1.

FIG. 6 is a front elevational view of a Santa Claus shaped ornament.

DESCRIPTION OF THE PREFERRED EMBODIMENT

Referring now to FIG. 1, there is illustrated therein a Christmas tree watering system 8 including an ornament 10 in the shape of a head of a reindeer, e.g., "Rudolph the Red Nosed Reindeer", which is suspended from a branch of a tree 12 by a wire 14. While an ornament in the shape of a head of a creature is preferred, it is to be understood that any shape of conventional or unconventional ornament can be used. The ornament 10 has a top portion 16 in the form or shape of the face of "Rudolph the Red Nosed Reindeer", which is hingedly or pivotally connected to a lower portion 18 forming a mouth or receptacle for receiving liquid. As shown in FIG. 4 the top or upper portion 16 substantially covers the lower liquid receptacle receiving portion 18 in a first, lower or closed position and as shown in FIG. 5 the top or upper portion 16 can be raised to a second, upper position to form an open space to permit water or other liquid to be poured into the liquid receptacle receiving portion 18.

In FIG. 1, there is shown the pouring of liquid from a pitcher 20 into the mouth of the opened ornament. Extending downwardly from the lower portion or mouth portion 18 of the ornament is a tubing 22 which extends downwardly to a container and tree holder 24 and through an opening 26 in the top 28 thereof which also receives the base 30 of the Christmas tree 12. Liquid exits from the bottom 32 of the tubing 22 for supplying water to the Christmas tree 12.

A liquid level sensor 34 is mounted on the tubing 32 and is connected by electrical wires 36 to the Christmas ornament 10. The container 24 has three or more support legs 38.

In FIG. 2 there is illustrated an electrical circuit 40 for the ornament 10 shown in FIG. 1. Typically, the circuitry 40 can be mounted within the upper head portion 16 of the ornament 10. The circuitry will include a battery 42 (or a connection to an electrical socket) which is connected to an audible alert 44 and/or to a visual alert 46 which is a light. A timer circuit (or on/off switch) 48 is connected between the liquid level sensor 34 and the audible alert 44 and/or the visual alarm 46 so that once the level sensor 34 completes the circuit to the alerts 44 and/or 46, the timer circuit 48 will cause the alert 44 and/or 46 to be presented only for a short period of time and, if desired, turned on again at a later time. In this respect, the timer can have a duty cycle of one (1) minute, on and thirty (30) minutes off, or whatever duty cycle is found to be most desirable to users of the Christmas tree watering system 8.

The sensor 34 can also be of the type which will indicate when the liquid in the container 24 has risen to a predetermined level to indicate that watering should cease.

FIGS. 3, 4 and 5 show the Rudolph the Red Nosed Reindeer shaped ornament with a nose 50 which can be a red light bulb or lamp 50 which is energized by the circuitry 40 shown in FIG. 2 for a short portion of the duty cycle, to indicate to someone looking at the Christmas tree 12 that water needs to be supplied to the tree 12.

Alternatively, the duty cycle could be such that the nose 50 of the reindeer shaped ornament 10 is caused to flash on and off for a period of say, two to three minutes, after which the timer circuit would maintain the red light bulb 50 deenergized.

An alternative embodiment of an ornament 60 is shown in FIG. 6. This ornament 60 is in the shape of Santa Claus or one of his helpers and can be caused to emit a sound such as a verbal message including a "Ho Ho Ho" or "water me" "water me" or "I am thirsty" when the audible alarm 44, shown in FIG. 2, is energized.

Still another alternative, is to provide an ornament 10 having a standard spherical shape which will blend in with other spherical shaped ornaments on the tree.

From the forgone description it will be apparent that the Christmas tree watering system 8 of the present invention has a number of advantages, some of which have been described above and others of which are inherent of the invention. Accordingly, the scope of the invention is only to limited as necessitated by the accompanying claims.

I claim:

1. A tree or plant watering system including an ornament having a lower liquid receptacle receiving portion and an upper, ornament configured portion which is constructed to substantially cover said liquid receptacle receiving portion and which is hingedly or pivotally connected to said lower liquid receptacle receiving portion for movement from a position substantially covering said liquid receptacle receiving portion to a position providing an open space for pouring liquid into said liquid receptacle receiving portion; means for mounting said ornament on the tree or plant; a tubing extending from the lower receptacle portion of the ornament to and into a container for holding liquid and for holding the base of the tree or plant; a liquid level sensor mounted in the container and being electrically connected to an alert associated with or mounted in or on the ornament; and said alert being actuated or de-actuated when the liquid in the container falls below a pre-determined level to indicate that the tree or plant needs to be watered.

2. The tree or plant watering system of claim 1 wherein said ornament upper portion is in the shape of the head of a reindeer and said upper portion of said ornament is pivotally connected to said lower liquid receptacle receiving portion.

3. The tree or plant watering system of claim 1 wherein the ornament upper portion is in the shape of the head of one of a Santa Claus creature or a Santa Claus helper with said upper portion pivotally connected to said lower liquid receptacle receiving portion.

4. The tree or plant watering system of claim 3 wherein the alert is an audible alert and is actuated, after liquid falls below a pre-determined level in the container, to emit a sound.

5. The tree or plant watering system of claim 4 wherein the sound is "HO HO HO".

6. The tree or plant watering system of claim 4 wherein the sound is a verbal message.

7. The tree or plant watering system of claim 1 wherein two alerts are provided, one being an audible alert and one being a light alert.

8. The tree or plant watering system of claim 7 wherein the audible alert is a sound which is emitted by the ornament.

9. The tree or plant watering system of claim 7 wherein the sound is a verbal message.

10. The tree or plant watering system of claim 1 wherein an electrical circuit is provided coupled to the liquid level detector or sensor and includes a battery, and least one of an audible alert or a visual alert and a timing circuit for controlling the duration that the alert is energized over a pre-determined duty cycle.

11. The tree or plant watering system of claim 10 wherein the duty cycle is one minute on and 30 minutes off.

12. The tree or plant watering system of claim 1 wherein said liquid level sensor is mounted on said tubing received in the container.

13. The tree or plant watering system of claim 1 wherein said ornament is in the shape of a standard Christmas tree ornament and has an upper portion hingedly connected to a lower liquid receptacle receiving portion.

14. A tree or plant watering system including an ornament having an upper portion, hingedly or pivotally connected to a lower liquid receptacle receiving portion; means for mounting said ornament on the tree or plant; a tubing extending from the lower receptacle portion of the ornament to and into a container for holding liquid and for holding the base of the tree or plant; a liquid level sensor mounted in the container and being electrically connected to an alert associated with or mounted in or on the ornament; said alert being actuated or de-actuated when the liquid in the container falls below a pre-determined level to indicate that the tree or plant needs to be watered said upper portion of said ornament having the shape of a reindeer head and said alert being a lamp forming the nose of the reindeer which is caused to be turned on fully or intermittently when the level of liquid in the container falls below or rises above a pre-determined level.

15. A tree or plant watering system including an ornament having an upper portion, hingedly or pivotally connected to a lower liquid receptacle receiving portion; means for mounting said ornament on the tree or plant; a tubing extending from the lower receptacle portion of the ornament to and into a container for holding liguid and for holding the base of the tree or plant; a liquid level sensor mounted in the container and being electrically connected to an alert associated with or mounted in or on the ornament; said alert being actuated or de-actuated when the liquid in the container falls below a pre-determined level to indicate that the tree or plant needs to be watered: an electrical circuit coupled to the liquid level detector or sensor including a battery, and least one of an audible alert or a visual alert, a timing circuit for controlling the duration that the alert is energized over a pre-determined duty cycle and wire conductors coiled about said tubing and connected to said liquid level sensor.

16. A tree or plant watering system including an ornament having a lower liquid receptacle receiving portion and an upper, ornament configured portion which is constructed to substantially cover said liquid receptacle receiving portion and which is hingedly or pivotally connected to said lower liquid receptacle receiving portion for movement from a position substantially covering said liquid receptacle receiving portion to a position providing an open space for pouring liquid into said liquid receptacle receiving portion; means for mounting said ornament on the tree or plant; a tubing extending from the lower receptacle portion of the ornament to and into a container for holding liquid and for holding the base of the tree or plant; a liquid level sensor mounted in the container and being electrically connected to an alert associated with or mounted in or on the ornament; and said alert being actuated or de-actuated when the liquid in the container rises above a pre-determined level to indicate that watering should cease.

* * * * *